United States Patent [19]
Kau et al.

[11] Patent Number: 5,491,829
[45] Date of Patent: Feb. 13, 1996

[54] METHOD AND SYSTEM FOR INDEXING THE ASSIGNMENT OF INTERMEDIATE STORAGE BUFFERS IN A SUPERSCALAR PROCESSOR SYSTEM

[75] Inventors: Chin-Cheng Kau, Austin; Aubrey D. Ogden; Donald E. Waldecker, both of Round Rock, all of Tex.

[73] Assignee: International Business Machines Corporation, Armonk, N.Y.

[21] Appl. No.: 438,819

[22] Filed: May 11, 1995

Related U.S. Application Data

[63] Continuation of Ser. No. 1,872, Jan. 8, 1993, abandoned.

[51] Int. Cl.⁶ ........................................ G06F 9/28
[52] U.S. Cl. ................... 395/800; 364/231.8; 364/263; 364/263.1; 364/DIG. 1
[58] Field of Search .................................. 395/800, 375

[56] References Cited

U.S. PATENT DOCUMENTS

| | | | |
|---|---|---|---|
| 5,237,694 | 8/1993 | Horne | 395/725 |
| 5,293,602 | 3/1994 | Fukagawa | 395/425 |
| 5,345,569 | 9/1994 | Tran | 395/375 |
| 5,367,650 | 11/1994 | Sharangpani | 395/375 |
| 5,416,913 | 5/1995 | Grochowski | 395/375 |

OTHER PUBLICATIONS

"The Metaflow Architecture" by V. Popescu et al., IEEE Micro, Jun. 1991, Metaflow Technologies Inc., pp. 10–13, 63–73.

Mike Johnson, "Superscalar Microprocessor Design", 1991, Prentice Hall, Englewood Cliffs, N.J. pp. 44–50, 168–170.

*Primary Examiner*—Eric Coleman
*Attorney, Agent, or Firm*—Michael A. Davis, Jr.; Andrew J. Dillon

[57] ABSTRACT

A method and system for enhanced instruction dispatch efficiency in a superscalar processor system having a plurality of intermediate storage buffers, a plurality of general purpose registers, and a storage buffer index. Multiple scalar instructions may be simultaneously dispatched from a dispatch buffer to a plurality of execution units. Each of the multiple scalar instructions generally include at least one source operand and one destination operand. A particular one of the plurality of intermediate storage buffers is assigned to a destination operand within a selected one of the multiple scalar instructions. A relationship between the particular one of the plurality of intermediate storage buffers and a designated one of the plurality of general purpose registers is stored in the storage buffer index at that time when the instruction which has been dispatched is replaced in the dispatcher by another instruction in the application program sequence. Results of execution from the selected one of the multiple scalar instructions are stored in the particular one of the intermediate storage buffers when the selected instruction is executed. The storage buffer index is used to determine which storage buffers to use as source operands for those instructions which are dispatched between the time that a storage buffer has been assigned for a specific general purpose register and the results of execution are moved from the storage buffer into the general purpose register.

6 Claims, 4 Drawing Sheets

METHOD AND SYSTEM FOR INDEXING THE ASSIGNMENT OF INTERMEDIATE STORAGE BUFFERS IN A SUPERSCALAR PROCESSOR SYSTEM

This is a continuation, division of application Ser. No. 08/001,872, filed Jan. 8, 1993, now abandoned.

CROSS-REFERENCE TO RELATED APPLICATION

The present application is related to U.S. Patent application Ser. No. 08/002,300, entitled "Method and System for Selective Serialization of Instruction Processing in a Superscalar Processor System," U.S. Patent application Ser. No. 08/001,864, now U.S. Pat. No. 5,465,373, entitled "Method and System for Single Cycle Dispatch of Multiple Instructions in a Superscalar Processor System," U.S. Patent application Ser. No. 08/001,865, entitled "Method and System for Enhanced Instruction Dispatch in a Superscalar Processor System Ulitizing Independently Accessed Intermediate Storage," U.S. Patent application Ser. No. 08/001,890, entitled "Method and System for Nonsequential Instruction Dispatch and Exectuion in a Superscalar Processor System," and U.S. Patent application Ser. No. 08/001,866, entitled "Method and System for Tracking Scalar Instructions Within a entitled "Method and System for Tracking Scalar Instructions Within a Superscalar Processor System," all filed of even date herewith by the inventors hereof and assigned to the assignee herein, and incorporated by reference herein.

BACKGROUND OF THE INVENTION

1. Technical Field

The present invention relates in general to an improved data processing system, and in particular to a method and system for enhanced instruction dispatch efficiency in a superscalar processor system. Still more particularly, the present invention relates to a method and system for indexing the assignment of intermediate storage buffers in a superscalar processor system.

2. Description of the Related Art

Designers of modern state-of-the-art processing systems are continually attempting to enhance performance aspects of such systems. One technique for enhancing data processing efficiency is the achievement of short cycle times and a low Cycles-Per-Instruction (CPI) ratio. An excellent example of the application of these techniques to an enhanced data processing system is the International Business Machines Corporation RISC System/6000 (RS/6000) computer. The RS/6000 system is designed to perform well in numerically intensive engineering and scientific applications as well as in multi-user, commercial environments. The RS/6000 processor employs a superscalar implementation, which means that multiple instructions are issued and executed simultaneously.

The simultaneous issuance and execution of multiple instructions requires independent functional units that can execute concurrently with a high instruction bandwidth. The RS/6000 system achieves this by utilizing separate branch, fixed point and floating point processing units which are pipelined in nature. In view of the pipelined nature of the processors in such systems, care must be taken to ensure that a result from a particular instruction which is necessary for execution of a subsequent instruction is obtained prior to dispatching the subsequent instruction. One technique for ensuring that such so-called "data dependency hazards" do not occur is the restriction of the dispatching of a particular instruction until such time as all preceding instructions have been dispatched. While this technique ensures that data dependency hazards will not occur, the performance penalty encountered utilizing this technique is substantial.

As a consequence, modern superscalar data processing systems often utilize a so-called "data dependency interlock circuit." Such circuits contain logic which operates in concert with instruction dispatch circuitry to ensure that an instruction is not dispatched until such time as a result from a preceding instruction which is necessary for correct execution of that instruction has been obtained. The amount of logic required to implement a data dependency interlock circuit is directly proportional to the number of source operands within each instruction. A source operand is a field within an instruction which is utilized to access an operand within a register file for utilization in execution of that instruction.

While data dependency interlock circuits permit data dependency hazards to be avoided without encountering the substantial performance penalty described above, the design and implementation of data dependency interlock circuits for instructions which include larger numbers of source and destination operands becomes quite complex. The dependency interlocks inhibit dispatch of dependent instructions which prevent following instructions, which may be independent and executable, from entering the dispatcher to be dispatched and executed.

The data dependency hazards which occur with the simultaneous execution of multiple instructions in a single processor cycle have also been addressed by utilizing an approach known as "register renaming." Register renaming is a technique utilized to temporarily place the results of a particular instruction into a register for potential use by later instructions prior to the time the final result from an instruction is placed within a register file. Register renaming is generally accomplished by providing a register file array with extra locations and a pointer arrangement to identify particular physical registers which have been assigned to logical registers. Selected prior art approaches also utilize multiple register file arrays to provide many "read" ports for data or for holding previous results for backup in the case of exceptions. While this technique provides the ability to simultaneously dispatch and execute multiple instructions where serial execution might otherwise be necessary, a problem exists with the dispatching of instructions to execution units utilizing such techniques. The requirement that an instruction utilize particular data or operands for execution has generally rendered it impossible to dispatch an instruction and associated data to an execution unit within a single processor cycle since the dispatch unit, or the execution unit must generally perform a complex read through a lookup table or pointer system to determine when a temporary register contains the required data for execution of the instruction.

Furthermore, certain systems may rename a register more than once in a single processor cycle. Consequently, in those systems which utilize a lookup table for register renaming, a massive lookup table may be necessary in order to be able to determine the most recently assigned rename buffer for a particular register.

It should therefore be apparent that a need exist for a method and system which permits instruction dispatch within a superscalar processor system within a single processor cycle by permitting data or operands to be dispatched promptly with the instructions.

SUMMARY OF THE INVENTION

It is therefore one object of the present invention to provide an improved data processing system.

It is another object of the present invention to provide an improved method and system for enhanced instruction dispatch efficiency in a superscalar processor system.

It is yet another object of the present invention to provide a method and system for indexing the assignment of intermediate storage buffers in a superscalar processor system.

The foregoing objects are achieved as is now described. A method and system is provided for enhanced instruction dispatch efficiency in a superscalar processor system having a plurality of intermediate storage buffers, a plurality of general purpose registers, and a storage buffer index. Multiple scalar instructions may be simultaneously dispatched from a dispatch buffer to a plurality of execution units. Each of the multiple scalar instructions generally include at least one source operand and one destination operand. A particular one of the plurality of intermediate storage buffers is assigned to a destination operand within a selected one of the multiple scalar instructions. A relationship between the particular one of the plurality of intermediate storage buffers and a designated one of the plurality of general purpose registers is stored in the storage buffer index at that time when the instruction which has been dispatched is replaced in the dispatcher by another instruction in the application program sequence. Results of execution from the selected one of the multiple scalar instructions are stored in the particular one of the intermediate storage buffers when the selected instruction is executed. The storage buffer index is used to determine which storage buffers to use as source operands for those instructions which are dispatched between the time that a storage buffer has been assigned for a specific general purpose register and the results of execution are moved from the storage buffer into the general purpose register.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
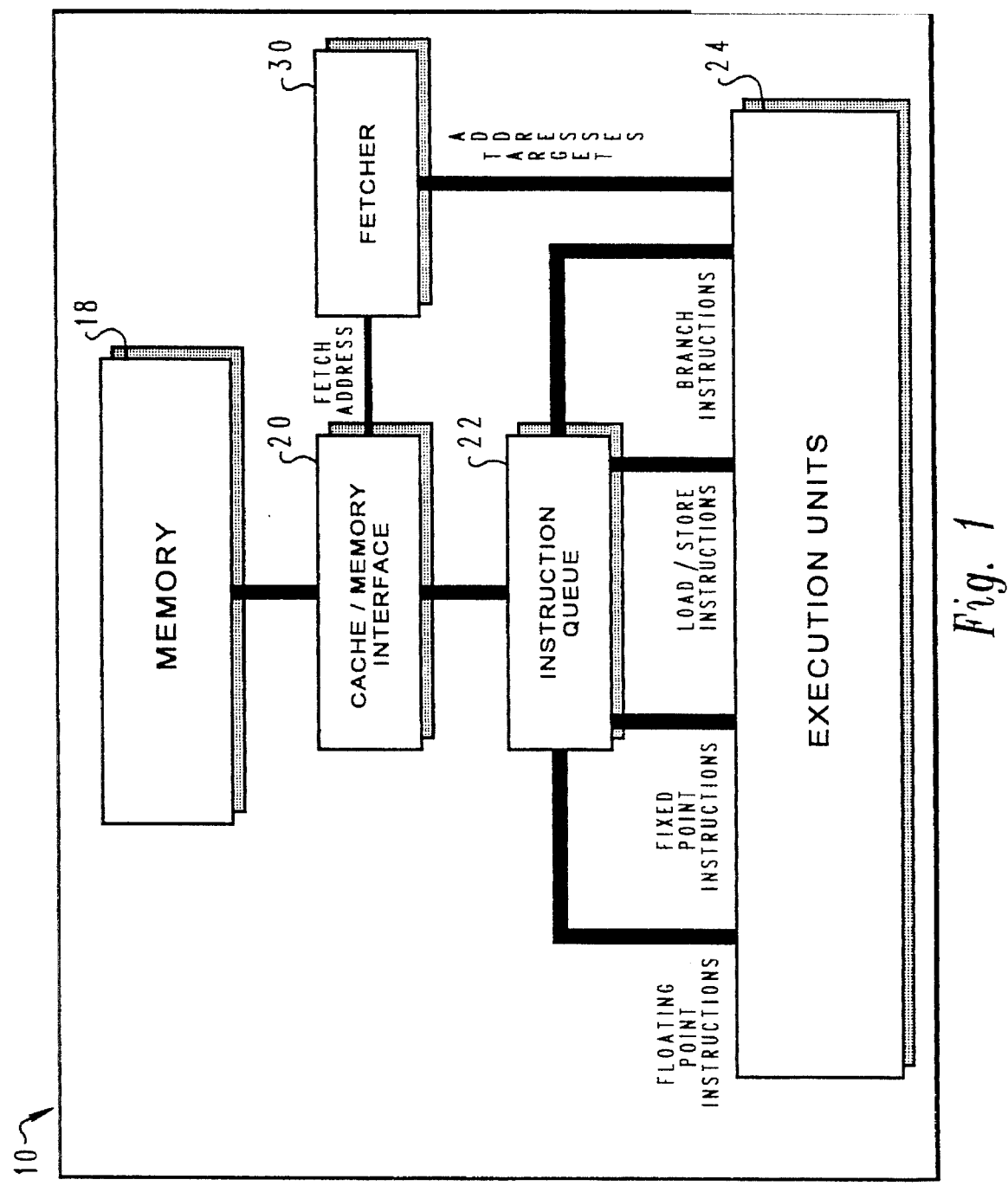
FIG. 1 is a high level block diagram of a superscalar processor system which may be utilized to implement the method and system of the present invention.

With reference now to the figures and in particular with reference to FIG. 1, there is depicted a high level block diagram of a superscalar data processing system 10 which may be utilized to implement the method and system of the present invention. As illustrated, data processing system 10 includes a memory 18 which is utilized to store data, instructions and the like. Data or instructions stored within memory 18 are preferably accessed utilizing cache/memory interface 20 in manner well known to those having skill in the art. The sizing and utilization of cache memory systems is a well known subspeciality within the data processing art and is not addressed within the present application. However, those skilled in the art will appreciate that by utilizing modern associative cache techniques, a large percentage of memory accesses may be achieved utilizing data temporarily stored within cache/memory interface 20.

Instructions from cache/memory interface 20 are typically loaded into instruction dispatch 22 which preferably includes a plurality of queue positions. In a typical embodiment of a superscalar data processing system each position within the instruction dispatch may include between two and eight instructions and thus, in a given cycle, up to eight instructions may be loaded into instruction dispatch 22, depending upon how many valid instructions are passed by cache/memory interface 20 and how much space is available within instruction dispatch 22.

As is typical in such superscalar data processing systems, instruction dispatcher 22 is utilized to dispatch instructions to execution units 24. As depicted within FIG. 1, data processing system 10 may include one or more floating point units, fixed point processor units, load/store units, and a branch processor unit, as a matter of design choice. Thus, instruction dispatcher 22 may dispatch multiple instructions during a single cycle, one to each execution unit. Execution units may include reservation stations which could permit dispatch of more than one instruction to a single execution unit during a single cycle, as a matter of design choice. Thus, multiple execution units in a superscalar processor may each receive multiple instructions in a single cycle. Additionally, in multiprocessor systems instructions may be dispatched to multiple execution units 24 associated with multiple processors.

Figure 2:
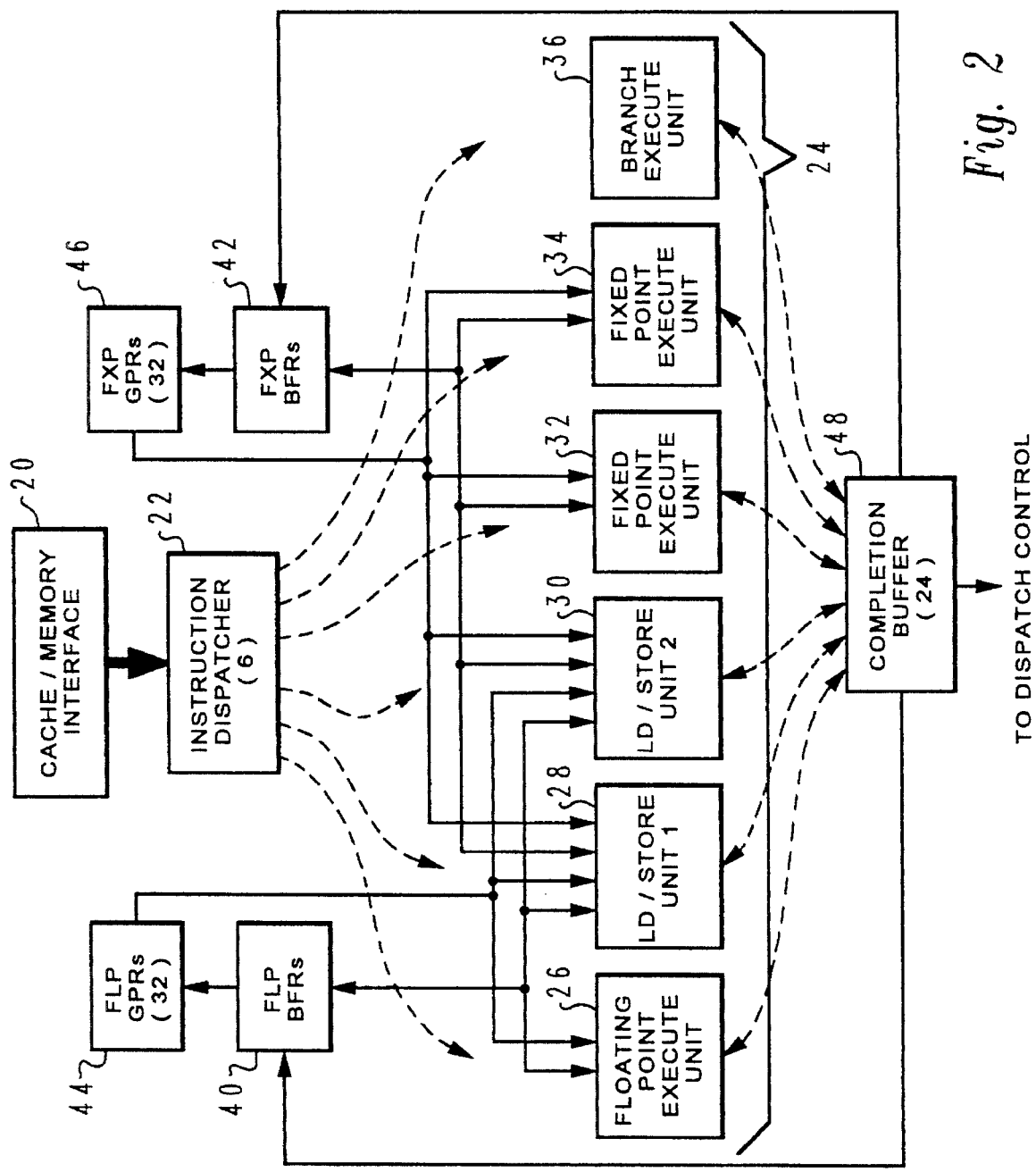
FIG. 2 is a more detailed block diagram of the instruction dispatch circuitry of the superscalar processor system of FIG. 1 which may be utilized to implement the method and system of the present invention.

Referring now to FIG. 2, there is depicted a more detailed block diagram of the instruction dispatch circuitry of the superscalar data processing system of FIG. 1 which may be utilized to implement the method and system of the present invention. As illustrated, instructions from cache/memory interface 20 are typically loaded into instruction dispatcher 22 in groups in an application specified sequential order. Thus, as a matter of design choice, a group of two, four, or eight instructions are loaded from cache/memory interface 20 into instruction dispatcher 22, for dispatch on an opportunistic basis to one or more execution units within execution units 24. As depicted in the illustrated embodiment within FIG. 2, these execution units may include a floating point execution unit 26, multiple load/store units 28 and 30, multiple fixed point execution units 32 and 34, and a branch execution unit 36. Of course, as discussed above, a greater or lesser number of execution units of different types may be included within data processing system 10 as a matter of design choice.

As is typical in superscalar data processing systems such as the type depicted herein, a plurality of general purpose registers are also provided. In the depicted embodiment within FIG. 2, two groups of general purpose registers are provided. Floating point general purpose registers 44 and fixed point general purpose registers 46. Thus, the results of the execution of multiple instructions within the execution units depicted within FIG. 2 are typically stored within a selected general purpose register for future utilization. In accordance with an important feature of the present invention, a plurality of intermediate storage buffers are also provided. That is, floating point intermediate storage buffers 40 and fixed point intermediate storage buffers 42. As will be explained in greater detail herein, each execution unit is connected to each intermediate storage buffer via an independent bus. Thus, data required by an execution unit, or generated by the execution of an instruction within an execution unit, may be placed on an independent bus and stored within a designated intermediate storage buffer for utilization by other execution units or for future transfer to a general purpose register.

In this manner, the maintaining of complex lookup tables typically associated with register renaming scheme is not required and an intermediate storage buffer may be efficiently assigned to be immediately utilized as a storage location for a destination operand, permitting the instruction to be dispatched within a single processor cycle, since data locations do not need to be determined within a renamed register file. Additionally, the execution of instructions in a non-sequential manner may be permitted, with the output of those instructions being temporarily stored within intermediate storage buffers for future assembly within the general purpose registers in the application specified sequential order.

As depicted, the fixed point execution units are each coupled via an independent bus to fixed point intermediate storage buffers 42, while the floating point execution unit is connected to each floating point intermediate storage buffer 40, via an independent bus. Load/store units 28 and 30, as those skilled in the art will appreciate, are necessarily connected to floating point intermediate storage buffers 40 and fixed point intermediate storage buffers 42, since these units will load and store both fixed point and floating point data.

In accordance with another important feature of the present invention a completion buffer 48 is provided. Completion buffer 48 is utilized to track the completion of the multiple scalar instructions which are being executed within execution units 24. The results of the execution of these instructions, as described above, are each temporarily stored within an associated intermediate storage buffer and, upon an indication that an instruction or a group of instructions have been completed successfully, in an application specified sequential order, completion buffer 48 may be utilized to initiate the transfer of the results of those completed instructions data to the associated general purpose registers. Additionally, in the event an exception condition occurs, completion buffer 48 may be utilized to initiate storage of the results of the execution of any instruction which completed prior to the exception and to control instruction dispatcher 22 to restart the process at the point where the exception condition occurred, permitting corrupted or invalid data to be replaced by a valid output in an efficient manner, or to initiate a new sequence of instructions as specified by the application specific program for specific types of exceptions.

Figure 3:
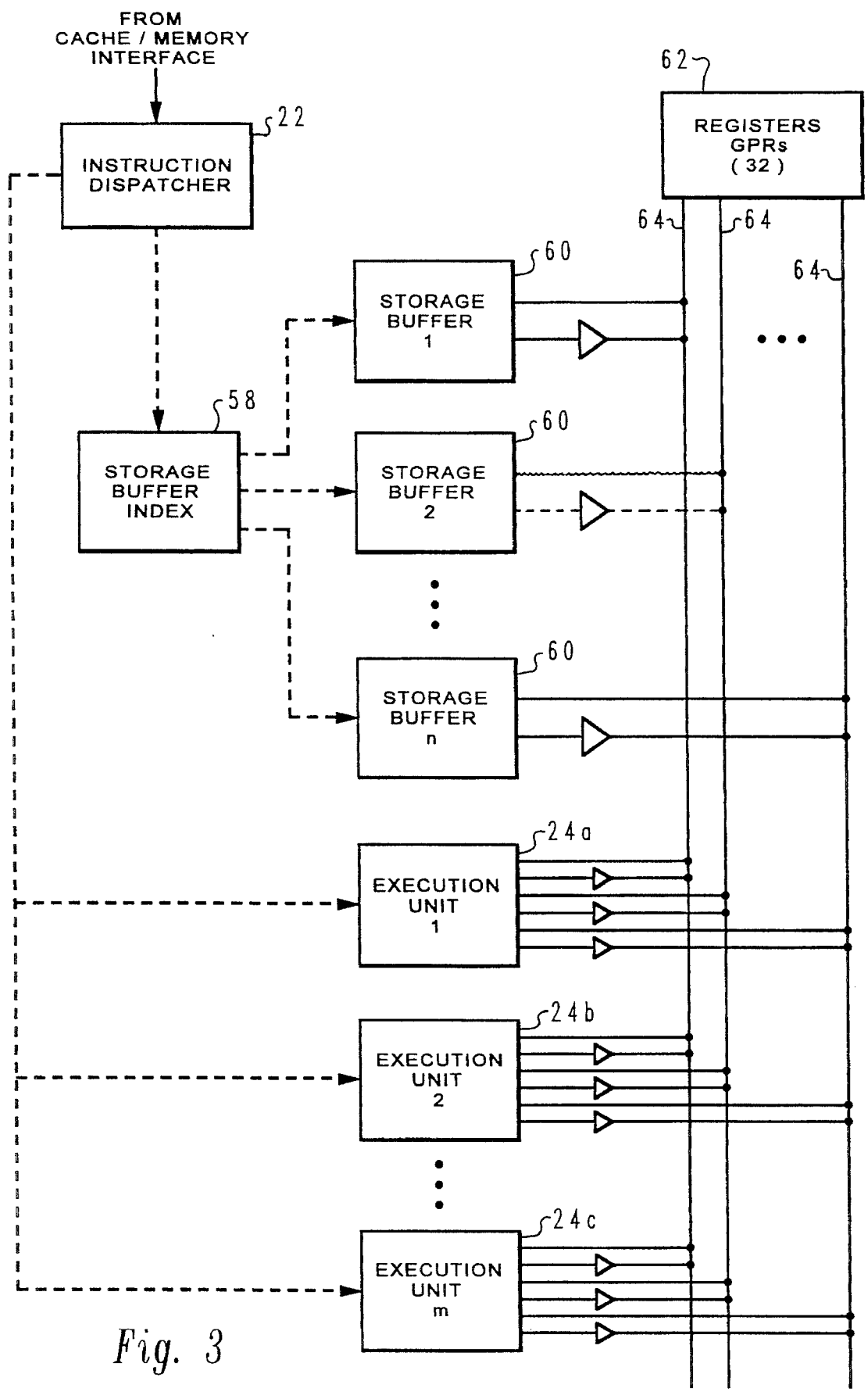
FIG. 3 is a high level block diagram which depicts the utilization of intermediate storage buffers within the superscalar processor system of FIG. 1 in accordance with the method and system of the present invention.

With reference now to FIG. 3, there is depicted a high level block diagram illustrating the utilization of intermediate storage buffers within the superscalar processor system of FIG. 1, in accordance with the method and system of the present invention. A storage buffer index 58 is provided which is accessible by instruction dispatcher 22. As will be described in greater detail herein, storage buffer index 58 is utilized to store and maintain an indication of the relationship between each of a plurality of intermediate storage buffers 60 and a designated general purpose register 62 for utilization during execution of succeeding instructions.

The plurality of intermediate storage buffers 60 are preferably connected to multiple independent buses 64. In the preferred embodiment, the number of independent buses 64 equals the number of intermediate storage buffers 60, with each intermediate storage buffer connected to one bus. Each of the intermediate storage buffers 60 may read from and write to a corresponding independent bus 64. Those skilled in the art will recognize that the number of buses utilized may vary as a matter of design choice.

A plurality of execution units 24a, 24b, 24c are coupled to each of the multiple independent buses 64. In the preferred embodiment, execution units 24a, 24b, 24c may include a floating point execution unit, multiple load/store units, multiple fixed point execution units, and a branch execution unit. However, those skilled in the art will appreciate that the number and type of execution units may vary as a matter of design choice.

Each of the plurality of execution units 24a, 24b, 24c may also read from and write to each of the independent buses 64. Consequently, each of the plurality of execution units 24a, 24b, 24c are coupled to each of the plurality of intermediate storage buffers 60 via the multiple independent buses 64. Thus, when data is generated by the execution of an instruction within an execution unit, the execution unit may place that data on a bus corresponding to a designated intermediate storage buffer which has been specified as a destination for that data, where the data may be temporarily stored. At the same time, the execution unit indicates the data on the bus is valid by setting a "valid" bit to an appropriate state. In this manner, while the data is on the bus, and before or at the same time the data is stored within the designated intermediate storage buffer, any other execution unit which requires that data may retrieve the data from the bus. Thus, one advantage of the provision of independent buses is the elimination of the need to store the data in a buffer and then thereafter access that data from the buffer. The ability to retrieve data directly from the bus will significantly increase the operation speed of the processor system.

Still referring to FIG. 3, it may be seen that multiple independent buses 64 are each coupled to general purpose registers 62. When an instruction is to be dispatched to an execution unit, the relationship between the designated intermediate storage buffer and the selected general purpose register is preferably stored within the storage buffer index 58. When the results of execution are needed by another execution unit, the transfer of those results may be performed utilizing the information within storage buffer index 58. As will be discussed in greater detail herein, the information stored within storage buffer index 58 may be an identifier for the designated intermediate storage buffer which is accessed utilizing the general purpose register identification or an identifier of a general purpose register which is accessed with the identification of the designated intermediate storage buffer.

In this manner, the maintenance of complex lookup tables typically associated with a register renaming scheme is not required, since an intermediate storage buffer may be immediately assigned as a storage location for each destination operand within an instruction to be dispatched, without requiring the renaming of a general purpose register file. Furthermore, storage buffer index 58 permits the execution of instructions in a non-sequential manner, since the results of execution of each instruction are temporarily stored in intermediate storage buffers 60, and may be subsequently utilized by a succeeding instruction by utilizing the information within storage buffer index 58 and the content of completion buffer 48 (see FIG. 2).

Figure 4:
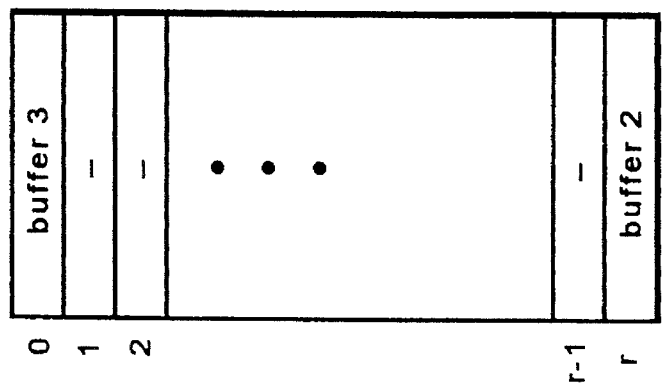
FIG. 4 is a pictorial representation of a storage buffer index within the superscalar processor system of FIG. 3 which may be utilized to implement the method and system of the present invention.

FIG. 4 is a pictorial representation of a storage buffer index within the superscalar processor system of FIG. 3 which may be utilized to implement the method and system of the present invention. Storage buffer index 58 comprises a number of entries, numbered 0–r. R equals the number of general purpose registers in the superscalar processor system. As discussed above, when an instruction which has previously been dispatched to an execution unit is replaced in the dispatcher by a subsequent application program specific instruction, the relationship between the destination operand within the dispatched instruction and the designated intermediate storage buffer is stored in storage buffer index 58. In this embodiment, an identifier for the designated intermediate storage buffer is stored in the entry corresponding to a selected general purpose register.

For example, in entry position 0, which corresponds to general purpose register 0, an identifier for intermediate storage buffer 3 has been stored. Additionally, in entry position r, which corresponds to general purpose register r, an identifier for intermediate storage buffer 2 has been stored. Thus, when the results of execution are to be transferred from intermediate storage buffer 3 to another execution unit, the transfer is accomplished by utilizing entry 0 in storage buffer index 58.

Figure 5:
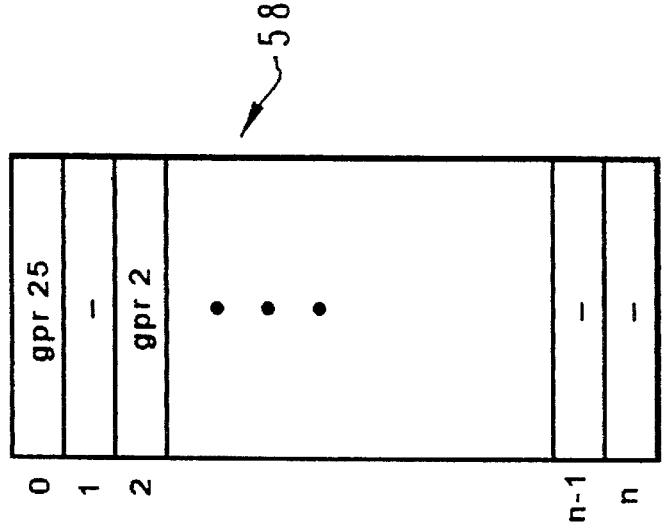
FIG. 5 is a pictorial representation of an alternative storage buffer index within the superscalar processor system of FIG. 3 which may be utilized to implement the method and system of the present invention.

FIG. 5 is a pictorial representation of an alternative storage buffer index within the superscalar processor system of FIG. 3 which may be utilized to implement the method and system of the present invention. Storage buffer index 58 comprises a number of entries, numbered 0–n. N equals the number of intermediate storage buffers in the superscalar processor system. When an instruction is dispatched to an execution unit, an identifier for the selected general purpose register is stored in the entry corresponding to the designated intermediate storage buffer where the results of execution are to be stored.

For example, in entry position 0, which corresponds to intermediate storage buffer 0, an identifier for general purpose register 25 has been stored. Additionally, in entry position 2, which corresponds to intermediate storage buffer 2, an identifier for general purpose register 2 has been stored. Thus, when the results of execution are to be transferred from intermediate storage buffer 0 to an alternate execution unit, the transfer is coordinated by utilizing the entry 0 in storage buffer index 58.

Upon reference to the foregoing, those skilled in the art will appreciate that Applicant has provided a method and system for indexing the assignment of intermediate storage buffers in a superscalar processor system. The need for massive associative lookup tables is eliminated, since the results of execution are stored temporarily in intermediate storage buffers until such time the results are stored in general purpose registers in an application specified order.

While the invention has been particularly shown and described with reference to a preferred embodiment, it will be understood by those skilled in the art that various changes in form and detail may be made therein without departing from the spirit and scope of the invention.

What is claimed is:

1. A method for enhanced instruction dispatch efficiency in a superscalar processor system capable of simultaneously dispatching multiple scalar instructions from a dispatch buffer to a plurality of execution units during a single cycle, each of said multiple scalar instructions including at least one source operand and one destination operand, wherein results of execution of said multiple scalar instructions are stored in a plurality of general purpose registers, said method comprising the steps of:

assigning a particular one of a plurality of intermediate storage buffers to a destination operand within each one of said multiple scalar instructions;

storing a relationship between each one of said plurality of intermediate storage buffers and a designated one of said plurality of general purpose registers in a storage buffer index;

temporarily storing results of execution of each one of said multiple scalar instructions in an assigned one of said plurality of intermediate storage buffers; and transferring said results of execution from a particular one of said plurality of intermediate storage buffers to an alternate one of said plurality of execution units for utilization in execution of an alternate one of said multiple scalar instructions utilizing said storage buffer index prior to a transfer of said results of execution from said particular one of said plurality of intermediate storage buffers to said designated one of said plurality of general purpose registers.

2. The method for enhanced instruction dispatch efficiency in a superscalar processor system of claim 1, wherein said step of storing a relationship between each one of said plurality of intermediate storage buffers and a designated one of a plurality of general purpose registers in a storage buffer index comprises storing an identifier for each one of said plurality of intermediate storage buffers in said storage buffer index, and accessing said identifier for each one of said plurality of intermediate storage buffers from said storage buffer index utilizing an identifier for each one of a plurality of general purpose registers.

3. The method for enhanced instruction dispatch efficiency in a superscalar processor system of claim 1, wherein said step of storing a relationship between each one of said plurality of intermediate storage buffers and a designated one of a plurality of general purpose registers in a storage buffer index comprises storing an identifier for said designated one of said plurality of general purpose registers in said storage buffer index, and accessing said identifier for said designated one of said plurality of general purpose registers from said storage buffer index-utilizing an identifier for each one of said plurality of intermediate storage buffers.

4. A system for enhanced instruction dispatch efficiency in a superscalar processor system capable of simultaneously dispatching multiple scalar instructions from a dispatch buffer to a plurality of execution units during a single cycle, each of said multiple scalar instructions including at least one source operand and one destination operand, wherein results of execution of said multiple scalar instructions are stored in a plurality of general purpose registers, said system comprising:

means for assigning a particular one of a plurality of intermediate storage buffers to a destination operand within each one of said multiple scalar instructions;

means for storing a relationship between each one of said plurality of intermediate storage buffers and a designated one of said plurality of general purpose registers in a storage buffer index;

means for temporarily storing results of execution of each one of said multiple scalar instructions in an assigned one of said plurality of intermediate storage buffers; and means for transferring said results of execution from a particular one of said plurality of intermediate storage buffers to an alternate one of said plurality of execution units for utilization in execution of an alternate one of said multiple scalar instructions utilizing said storage buffer index prior to a transfer of said results of execution from said particular one of said plurality of intermediate storage buffers to said designated one of said plurality of general purpose registers.

5. The system for enhanced instruction dispatch efficiency in a superscalar processor system of claim 4, wherein said means for storing a relationship between each one of said plurality of intermediate storage buffers and a designated one of a plurality of general purpose registers in a storage buffer index comprises means for storing an identifier for each one of said plurality of intermediate storage buffers in said storage buffer index, and means for accessing said identifier for each one of said plurality of intermediate storage buffers from said storage buffer index utilizing an identifier for said designated one of a plurality of general purpose registers.

6. The system for enhanced instruction dispatch efficiency in a superscalar processor system of claim 4, wherein said means for storing a relationship between each one of said plurality of intermediate storage buffers and a designated one of a plurality of general purpose registers in a storage buffer index comprises means for storing an identifier for said designated one of said plurality of general purpose registers in said storage buffer index, and means for accessing said identifier for said designated one of said plurality of general purpose registers from said storage buffer index utilizing an identifier for each one of said plurality of intermediate storage buffers.

* * * * *